US012628088B2

(12) United States Patent
Zhang et al.

(10) Patent No.: US 12,628,088 B2
(45) Date of Patent: May 12, 2026

(54) TRANSMIT POWER CONTROL IN WIRELESS COMMUNICATION NETWORKS

(71) Applicant: HUAWEI TECHNOLOGIES CO., LTD., Shenzhen (CN)

(72) Inventors: Liqing Zhang, Kanata (CA); Hao Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 18/504,113

(22) Filed: Nov. 7, 2023

(65) Prior Publication Data

US 2024/0073826 A1 Feb. 29, 2024

Related U.S. Application Data

(63) Continuation of application No. PCT/CN2021/094079, filed on May 17, 2021.

(51) Int. Cl.
*H04W 52/14* (2009.01)

(52) U.S. Cl.
CPC .................................. *H04W 52/146* (2013.01)

(58) Field of Classification Search
CPC . H04W 52/146; H04W 52/16; H04W 52/242; H04W 52/325; H04W 52/34; H04W 52/42
See application file for complete search history.

(56) References Cited

U.S. PATENT DOCUMENTS

| | | | | |
|---|---|---|---|---|
| 11,399,345 B2 * | 7/2022 | Sun | ......................... | H04W 52/10 |
| 12,192,910 B2 * | 1/2025 | Kang | .................. | H04W 52/367 |
| 12,408,114 B2 * | 9/2025 | Go | ....................... | H04W 52/146 |
| 2016/0183195 A1 | 6/2016 | Gao et al. | | |
| 2022/0295413 A1 * | 9/2022 | Park | ....................... | H04W 52/42 |
| 2023/0224818 A1 * | 7/2023 | Haghighat | .......... | H04W 52/146 |
| | | | | 455/522 |
| 2024/0056990 A1 * | 2/2024 | Deghel | .................. | H04W 72/21 |
| 2024/0251403 A1 * | 7/2024 | Chen | ................. | H04W 72/0473 |

FOREIGN PATENT DOCUMENTS

| | | |
|---|---|---|
| CN | 103155658 A | 6/2013 |
| CN | 105745975 B | 12/2020 |
| WO | 2010107880 A2 | 9/2010 |
| WO | 2016045130 A1 | 3/2016 |

OTHER PUBLICATIONS

3 Generation Parynership Projecy; Technical Specificaton Group Radio Access Network; Evolved Universal Terrestrial Radio Access (E-UTRA); Physical layer procedures (Release 16),XP052000292,3GPP TS 36.213.V16.5.0(Mar. 2021), total 53 pages.
InterDigital Inc., "Common and Beam Specific Power Control Parameters", 3GPP TSG RAN WG1 Meeting #90, R1-1714170, Prague, Czech Republic, Aug. 21-25, 2017, 5 pages.

* cited by examiner

*Primary Examiner* — Fayyaz Alam

(57) ABSTRACT

One or more first transmit power control parameters that are common to transmit power control for multiple different physical uplink channels are transmitted by a network device and received by a user equipment (UE) in a wireless communication network. The UE transmits, and the network device receives, one of the multiple different physical uplink channels. That uplink channel is transmitted at a transmit power that is based on the first transmit power control parameter(s) and one or more second transmit power control parameters that are specific to the transmit power control for the uplink channel.

22 Claims, 5 Drawing Sheets

110,170 or 172

TRANSMIT POWER CONTROL IN WIRELESS COMMUNICATION NETWORKS

CROSS-REFERENCE TO RELATED APPLICATION

This application is a continuation of International Application No. PCT/CN2021/094079, filed on May 17, 2021, and entitled "TRANSMIT POWER CONTROL IN WIRELESS COMMUNICATION NETWORKS," the disclosure of which is hereby incorporated by reference in its entirety.

FIELD

This application relates generally to communications in wireless communication networks, and in particular to transmit power control in such networks.

BACKGROUND

In $4^{th}$-generation (4G) and earlier generation wireless communication networks, there are multiple uplink channels. Uplink channels may include, for example, a random access channel (RACH), uplink data channels such as physical uplink shared channel (PUSCH), and uplink control channels such as physical uplink control channel (PUCCH) and sounding reference signal (SRS) channel. Although these channels may experience similar channel conditions and interference environments, each uplink channel may have its own power control parameters and separate configurations in conventional approaches to transmit power control.

Across different uplink channels, there may be redundant power control parameters, such as maximum transmit power of a particular device or parameters that are expected to change over a relatively long time period, configured separately for each uplink channel. Each uplink channel may have numerous power control parameters, and such parameters may have numerous possible values for each channel without an indication of how to use these parameters, for example to achieve certain expected performance.

Providing more efficient transmit power control, in terms of reducing configuration overhead and/or optimizing power control for example, remains a challenge. Per-channel power control configurations according to some conventional power control techniques can involve significant overhead in providing power control parameter values to communication devices. It may also be desirable to better optimize uplink channel power control parameter determination.

SUMMARY

Some embodiments of the present disclosure provide a unified power control methodology that is able to reduce redundancy and simplify very complicated power control configurations. Such a unified methodology can be readily optimized, and provide forward compatibility, with modelling for training by artificial intelligence (AI), for example.

Commonality of parameters for transmit power control can be considered in developing a single reference model for all uplink channels. One reference model can be applicable not only to uplink channels for a single communication device, but also to more than one communication device, such as to communication devices of a certain group or type.

With a baseline or reference model, differential or differentiation power control may be applied to control offsets for different uplink channels on demand. Transmit power control parameters or factors and differences between uplink channels, such as a 1-symbol channel versus a 2-symbol channel for example, affect offsets or adjustments that are applicable to change transmit power for a particular uplink channel relative to the reference model.

One aspect of the present disclosure relates to a method that involves receiving, by a UE in a wireless communication network, a first transmit power control parameter that is common to transmit power control for multiple different physical uplink channels; and transmitting, by the UE, one of the multiple different physical uplink channels. The transmitting involves transmitting the one of the multiple different physical uplink channels at a transmit power that is based on the first transmit power control parameter and a second transmit power control parameter that is specific to the transmit power control for the one of the multiple different physical uplink channels.

A UE for a wireless communication network, according to another aspect of the present disclosure includes: a communication interface; a processor, coupled to the communication interface; and a non-transitory computer readable storage medium, coupled to the processor. The non-transitory computer readable storage medium stores programming for execution by the processor. The programming includes instructions to: receive a first transmit power control parameter that is common to transmit power control for multiple different physical uplink channels; and transmit one of the multiple different physical uplink channels at a transmit power that is based on the first transmit power control parameter and a second transmit power control parameter that is specific to the transmit power control for the one of the multiple different physical uplink channels.

Another embodiment that includes such a medium relates to a computer program product including a non-transitory computer readable storage medium storing programming. The programming includes instructions to: receive a first transmit power control parameter that is common to transmit power control for multiple different physical uplink channels; and transmit one of the multiple different physical uplink channels. The one of the multiple different physical uplink channels is transmitted at a transmit power that is based on the first transmit power control parameter and a second transmit power control parameter that is specific to the transmit power control for the one of the multiple different physical uplink channels.

A method according to a further aspect of the present disclosure involves transmitting, by a network device to a UE in a wireless communication network, a first transmit power control parameter that is common to transmit power control at the UE for multiple different physical uplink channels. Such a method may also involve receiving, by the network device from the UE, one of the multiple different physical uplink channels transmitted by the UE at a transmit power that is based on the first transmit power control parameter and a second transmit power control parameter that is specific to the transmit power control for the one of the multiple different physical uplink channels.

Another aspect of the present disclosure relates to a network device for a wireless communication network. Such a network device may include: a communication interface; a processor, coupled to the communication interface; and a non-transitory computer readable storage medium, coupled to the processor. The non-transitory computer readable storage medium stores programming for execution by the processor. The programming includes instructions to transmit, to a UE in the wireless communication network, a first transmit power control parameter that is common to transmit power control at the UE for multiple different physical uplink channels. The programming also includes instructions to receive, from the UE, one of the multiple different physical uplink channels transmitted by the UE. The one of the multiple different physical uplink channels is transmitted by the UE at a transmit power that is based on the first transmit power control parameter and a second transmit power control parameter. The second transmit power control parameter is specific to the transmit power control for the one of the multiple different physical uplink channels.

Another embodiment that relates to such a medium is a computer program product including a non-transitory computer readable storage medium storing programming. The programming includes instructions to: transmit, by a network device to a UE in a wireless communication network, a first transmit power control parameter that is common to transmit power control at the UE for multiple different physical uplink channels; and receive, by the network device from the UE, one of the multiple different physical uplink channels transmitted by the UE at a transmit power that is based on the first transmit power control parameter and a second transmit power control parameter that is specific to the transmit power control for the one of the multiple different physical uplink channels.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Figure 1:
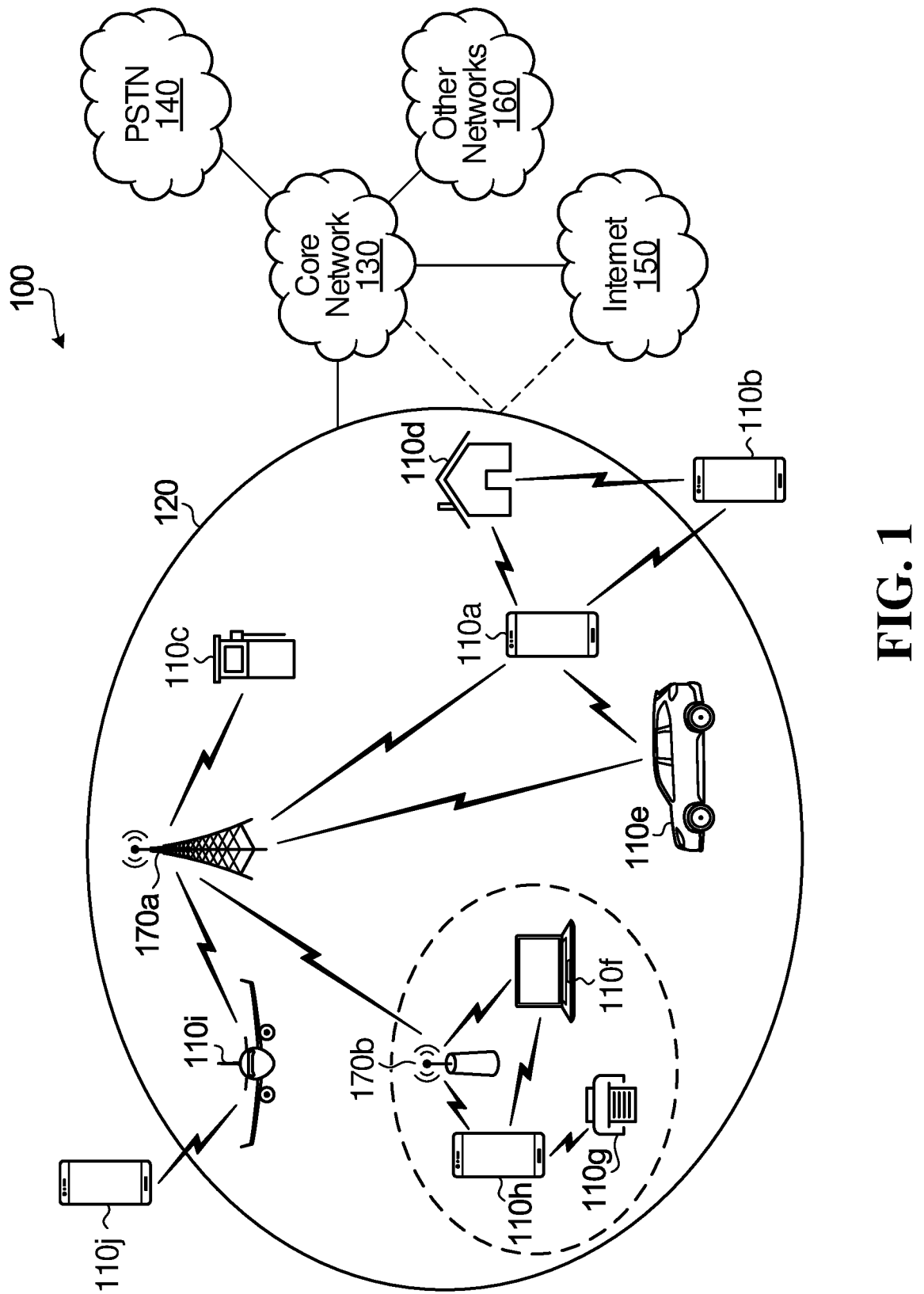
FIG. 1 is a block diagram that provides a simplified schematic illustration of a communication system.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electronic device (ED) 110a-110j (generically referred to as 110) may be interconnected to one another, and may also or instead be connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
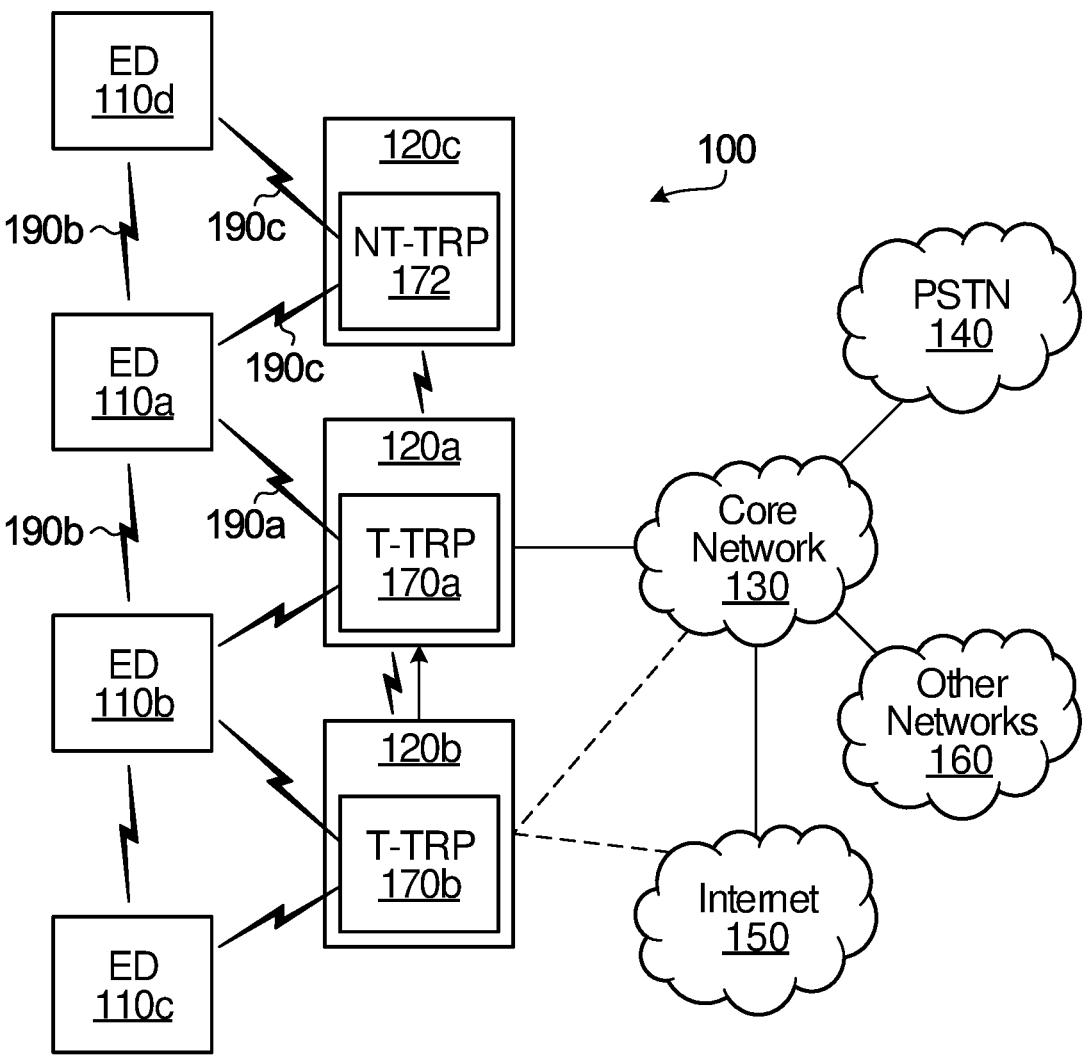
FIG. 2 is a block diagram illustrating another example communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered subsystems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120*a* and 120*b* are in communication with the core network 130 to provide the EDs 110*a* 110*b*, and 110*c* with various services such as voice, data, and other services. The RANs 120*a* and 120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a* and 120*b* or EDs 110*a* 110*b*, and 110*c* or both, and (ii) other networks (such as the PSTN 140, the internet 150, and the other networks 160). In addition, some or all of the EDs 110*a* 110*b*, and 110*c* may include functionality for communicating with different wireless networks over different wireless links using different wireless technologies and/or protocols. Instead of wireless communication (or in addition thereto), the EDs 110*a* 110*b*, and 110*c* may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110*a* 110*b*, and 110*c* may be multimode devices capable of operation according to multiple radio access technologies, and incorporate multiple transceivers necessary to support such technologies.

Figure 3:
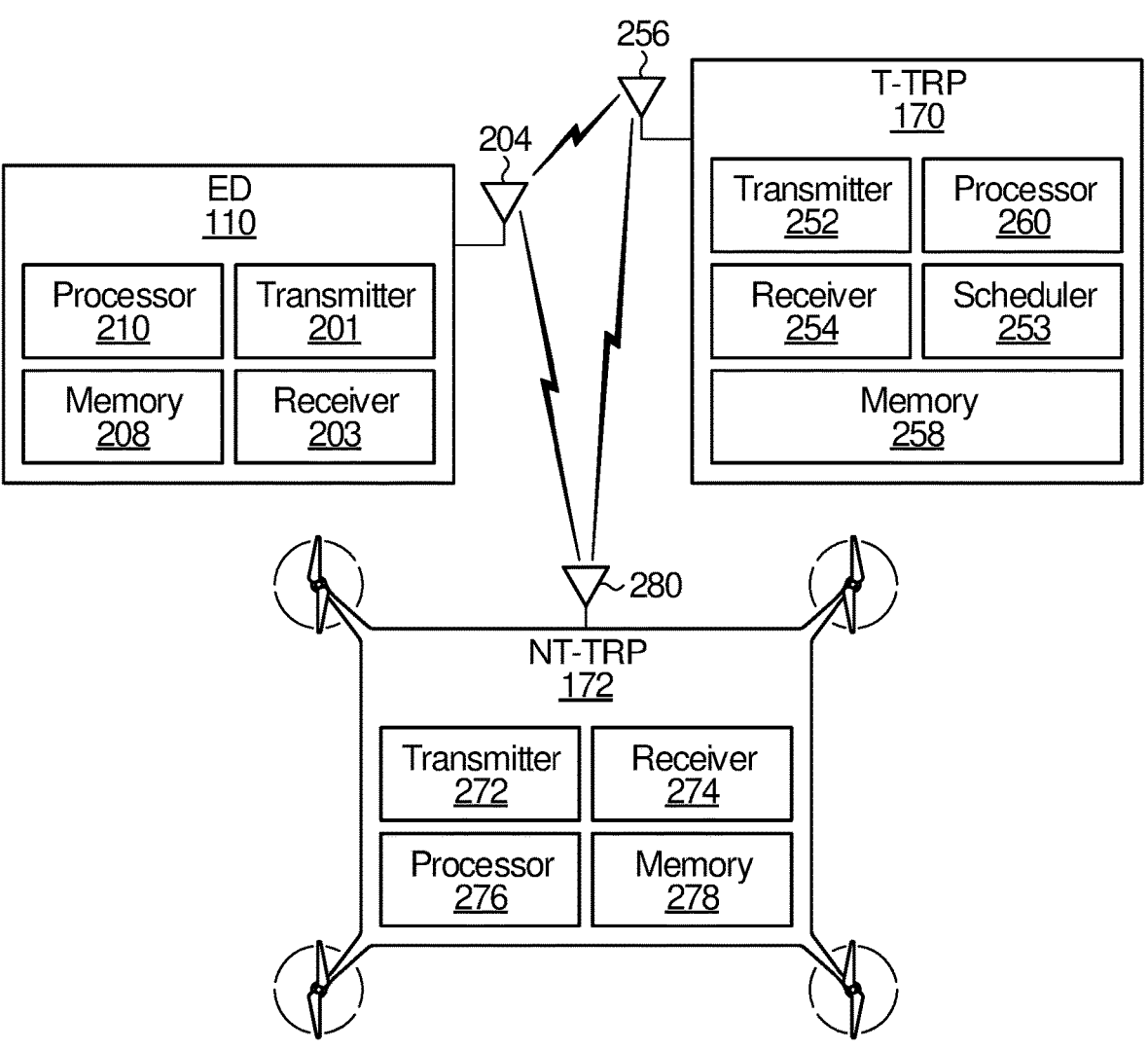
FIG. 3 is a block diagram illustrating example electronic devices and network devices.

FIG. 3 illustrates another example of an ED 110 and network devices, including a base station 170*a*, 170*b* (at 170) and an NT-TRP 172. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 210 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distributed unit (DU), positioning node, among other possibilities. The T-TRP 170 may be macro BSs, pico BSs, relay node, donor node, or the like, or combinations thereof. The T-TRP 170 may refer to the forging devices, or to apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. multiple-input multiple-output (MIMO) precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 4:
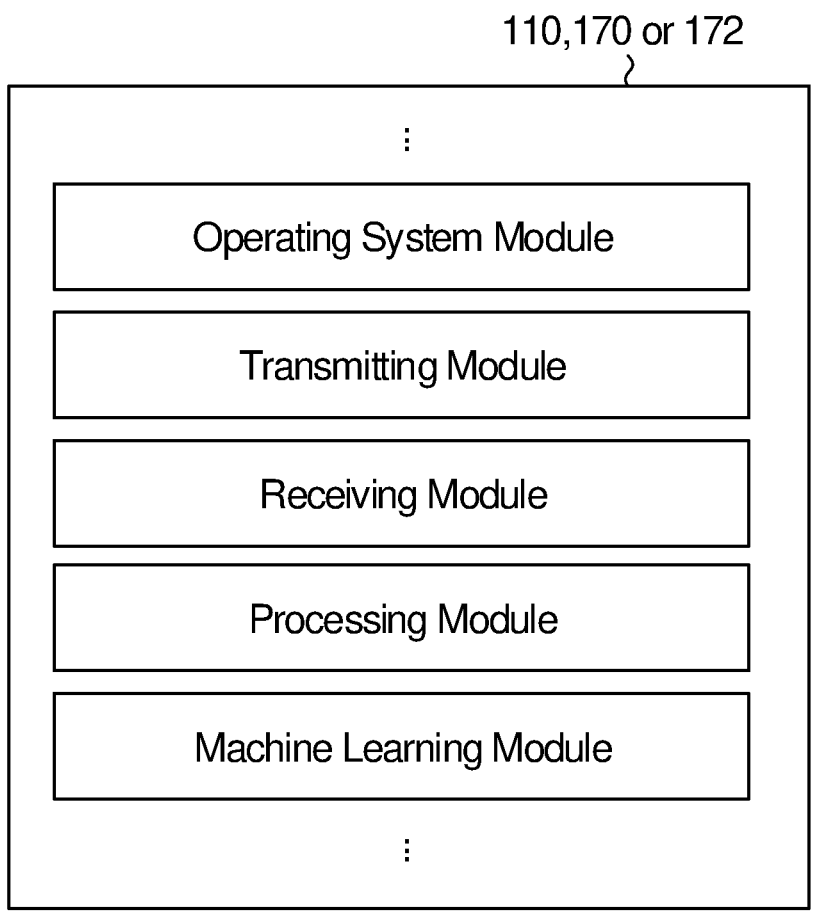
FIG. 4 is a block diagram illustrating units or modules in a device.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

In future wireless networks, the number of new devices could be increased exponentially with diverse functionalities. Also, a lot more new applications and use cases than 5G may emerge with more diverse quality of service demands. These will result in new key performance indications (KPIs) for future wireless networks (for example, 6G network) that can be extremely challenging, and technologies such as AI technologies, especially ML and deep learning technologies, may be introduced to telecommunication for improving system performance and efficiency.

AI/ML technologies may be applied to communication, including AI/ML communication in the physical (PHY) layer and AI/ML communication in the MAC layer. For physical layer, AI/ML communication may be used to optimize component design and improve algorithm performance, like AI/ML on channel coding, channel modelling, channel estimation, channel decoding, modulation, demodulation, MIMO, waveform, multiple access, PHY element parameter optimization and update, beam forming and tracking, sensing and positioning, and so on. For MAC layer, AI/ML communication may enable utilization of AI/ML capability with learning, prediction and decision making to solve complicated optimization problems with better strategy and optimal solution, for example, to optimize the functionality in MAC, such as intelligent TRP management, intelligent beam management, intelligent channel resource allocation, intelligent power control, intelligent spectrum utilization, intelligent MCS, intelligent HARQ strategy, intelligent transmit (Tx)/receive (Rx) mode adaption, and so on.

AI/ML architectures usually involve multiple nodes. The multiple nodes can be organized in two modes, including centralized and distributed, both of which can be deployed in an access network, a core network, or an edge computing system or third network. A centralized training and computing architecture may be restricted by huge communication overhead and strict user data privacy. Distributed training and computing architecture comprises several frameworks, including distributed machine learning and federated learning for example. AI/ML architectures may include an intelligent controller which can perform as single agent or multi-agent, based on joint optimization or individual optimization. A new protocol and signaling mechanism may be implemented so that the corresponding interface link can be personalized with customized parameters to meet particular requirements while minimizing signaling overhead and maximizing the whole system spectrum efficiency by personalized AI technologies.

Additional details regarding the EDs 110, T-TRP 170, and NT-TRP 172 are known to those of skill in the art. As such, these details are omitted here.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g. data) over a wireless communications link. The wireless communications link may support a link between a radio access network and user equipment (sometimes referred to as a "Uu link"), and/or the wireless communications link may support a link between device and device, such as between two user equipments (sometimes referred to as "sidelink"), and/or the wireless communications link may support a link between a non-terrestrial (NT)-communication network and user equipment (UE). The following are some examples for the above components:

A waveform component may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

A frame structure component may specify a configuration of a frame or group of frames. The frame structure component may indicate one or more of a time, frequency, pilot signature, code, or other parameter of the frame or group of frames.

A multiple access scheme component may specify multiple access technique options, including technologies defining how communicating devices share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources, and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission, and a re-transmission mechanism.

A coding and modulation component may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all concept". For example, the components within the air interface cannot be changed or adapted once the air interface is defined. In some implementations, only limited parameters or modes of an air interface, such as a cyclic prefix (CP) length or a multiple input multiple output (MIMO) mode, can be configured. In some embodiments, an air interface design may provide a unified or flexible framework to support below 6 GHz and beyond 6 GHz frequency (e.g., mmWave) bands for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain, and a frequency domain self-contained design may support more flexible radio access network (RAN) slicing through channel resource sharing between different services in both frequency and time.

In a wireless communication network, a device such as a base station may provide coverage over a cell. Wireless communication with the device may occur over one or more carrier frequencies. A carrier frequency may be referred to as a carrier. A carrier may alternatively be called a component carrier (CC). A carrier may be characterized by its bandwidth and a reference frequency, such as the center or lowest or highest frequency of the carrier. A carrier may be on licensed or unlicensed spectrum. Wireless communication with the device may also or instead occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs. For example, a carrier may have a bandwidth of 20 MHz and consist of one BWP, a carrier may have a bandwidth of 80 MHz and consist of two adjacent contiguous BWPs, and so on. In other embodiments, a BWP may have one or more carriers. For example, a BWP may have a bandwidth of 40 MHz and consist of two adjacent contiguous carriers, where each carrier has a bandwidth of 20 MHz. In some embodiments, a BWP may comprise non-contiguous spectrum resources consisting of non-contiguous multiple carriers, where the first carrier of the non-contiguous multiple carriers may be in mmWave band, the second carrier may be in a low band (such as 2 GHz band), the third carrier (if it exists) may be in THz band, and the fourth carrier (if it exists) may be in visible light band. Resources in one carrier which belong to the BWP may be contiguous or non-contiguous. In some embodiments, a BWP has non-contiguous spectrum resources on one carrier.

Wireless communication may occur over an occupied bandwidth. The occupied bandwidth may be defined as the width of a frequency band such that, below the lower and above the upper frequency limits of the band, the mean powers emitted are each equal to a specified percentage of the total mean transmitted power, such as 0.5%.

The carrier, the BWP, or the occupied bandwidth may be signaled by a network device (a base station, for example) dynamically, in physical layer control signaling such as downlink control information (DCI) for example, or semi-statically, in radio resource control (RRC) signaling or in the MAC layer for example; or be predefined based on an application scenario, be determined by a UE as a function of other parameters that are known by the UE, or be fixed, by a standard for example.

A wireless communication system may support different uplink channels, and there may be related or redundant power control parameters across those different uplink channels.

Consider PUSCH as an example, for which transmit power per resource block (RB) for a UE, and in particular transmit power density per RB in dBm, is given below:

$$P_{PUSCH,b,f,c}(i, j, q_d, l) = \min \begin{Bmatrix} P_{CMAX,f,c}(i), \\ P_{O\_PUSCH,b,f,c}(j) + \\ 10\log_{10}\left(2^{\mu} \cdot M_{RB,b,f,c}^{PUSCH}(i)\right) + \\ \alpha_{b,f,c}(j) \cdot PL_{b,f,c}(q_d) + \\ \Delta_{TF,b,f,c}(i) + f_{b,f,c}(i, l) \end{Bmatrix}$$

where b denotes an uplink BWP;

f denotes carrier frequency;

c denotes a serving cell;

i denotes a transmission time occasion;

j denotes a configuration set index;

$q_d$ denotes a reference signal (RS) index;

I denotes a power control state index for closed loop power control in this example;

$P_{CMAX,f,c}(i)$ denotes a UE-configured maximum output power;

$P_{O\_PUSCH,b,f,c}(j)$ denotes and expected received power;

$\mu$ denotes a scaling parameter that is related to numerology;

$$M_{RB,b,f,c}^{PUSCH}(i)$$

denotes bandwidth of a PUSCH resource assignment expressed as a number of RBs;

$\alpha_{b,f,c}(j)$ denotes a path loss compensation factor;

$PL_{b,f,c}(q_d)$ denotes a downlink path loss (PL) estimate, in dB, calculated by the UE using an RS with index $q_d$;

$\Delta_{TF,b,f,c}(i)$ denotes a power control parameter that is related to modulation and coding scheme (MCS); and $f_{b,f,c}(i, l)$ denotes a power control command for transmission time occasion i with a state index I, to adjust power offset.

Another channel example is PUCCH, for which UE transmit power density per RB in dBm is given below:

$$P_{PUCCH,b,f,c}(i, q_u, q_d, l) = \min \begin{Bmatrix} P_{CMAX,f,c}(i), \\ P_{O\_PUCCH,b,f,c}(q_u) + \\ 10\log_{10}\left(2^{\mu} \cdot M_{RB,b,f,c}^{PUCCH}(i)\right) + \\ PL_{b,f,c}(q_d) + \Delta_{F\_PUCCH}(F) + \\ \Delta_{TF,b,f,c}(i) + g_{b,f,c}(i, l) \end{Bmatrix}$$

where parameters are similar to those in the PUSCH expression above, except that there is full path loss compensation $(\alpha=1)$ and the parameter $\Delta_{F\_PUCCH}(F)$ has a value of $\Delta_{F\_PUCCH}(\text{fk})$ for PUCCH format k (k=0, . . . , 4), or can be 0 if not provided.

As a further example, UE transmit power density per RB in dBm for SRS is given below:

$$P_{SRS,b,f,c}(i, q_s, l) = \min \begin{Bmatrix} P_{CMAX,f,c}(i), \\ P_{O\_SRS,b,f,c}(q_s) + \\ 10\log_{10}(2^{\mu} \cdot M_{SRS,b,f,c}(i)) + \\ \alpha_{SRS,b,f,c}(q_s) \cdot PL_{b,f,c}(q_d) + \\ h_{b,f,c}(i, l) \end{Bmatrix}$$

where parameters are similar to those in the PUSCH expression above, except that there is no MCS-based parameter.

For physical RACH (PRACH), UE transmit power density per RB in dBm is given below:

$$P_{PRACH,b,f,c}(i) = \min\{P_{CMAX,f,c}(i), P_{PRACH,target,f,c} + PL_{b,f,c}\}$$

where again some parameters are similar to those in the PUSCH expression above, and where $P_{PRACH,target,f,c}$ denotes PRACH target reception power PREAMBLE_RE-CEIVED_TARGET_POWER provided by higher layers.

From these examples for PUSCH, PUCCH, SRS, and PRACH, it can be observed that current power control techniques for these channels involve one or more power control parameters that may be considered redundant if configured separately for each of these uplink channels, especially in the case of large time-scale parameters, such as $P_0$ and $\alpha$ in these examples, that may be semi-statically configured. A large-scale parameter, also referred to herein as a large time-scale parameter, means a slow (more than 10 ms for example) varying parameter, as compared to a dynamic transmission scheduling period (10 ms or less, for example).

In future networks, such as 6th-generation (6G) networks and beyond, it is expected that more parameters or factors will be taken into account in power control mechanisms. For example, different types of network nodes such as drone, unmanned aerial vehicle, satellite station, and terrestrial base station may impact power control. Such additional parameters to be considered in power control may be common to multiple uplink channels, and possibly all uplink channels, and thus it may further increase overhead if those parameters are signaled to communication devices separately for different uplink channels.

Furthermore, with at least some current power control schemes, there may be instability or inconsistency in performance among different uplink channels due to separate and independent power control parameter configurations, and there may be no guarantee of power control performance across different channels due to different configuration values for at least parameters such as large time-scale parameters. The $P_0$ and $\alpha$ terms in the examples above are illustrative of large time-scale parameters.

Some embodiments disclosed herein relate to simplifying power control parameter configuration and potentially achieving consistent and expected performance. This may involve applying two-level power control modeling with optimized or potentially AI trained power control parameters.

First-level or high-level power control modeling may be associated with large time-scale parameters that are common to one or more uplink channels, which in some embodiments are optimized over one or more conditions or characteristics such as path loss and possibly intra-cell or inter-cell interference measurement. Power control parameters that are applied in transmit power control for multiple uplink channels may be simulated, AI-trained, or otherwise determined using power control modeling for baseline parameter optimization, for example.

Second-level power control modeling may be associated with smaller time-scale and more dynamic parameters for each individual uplink channel. A small or smaller scale parameter, also referred to herein as a small or smaller time-scale parameter, means a faster time varying parameter as compared with a large time-scale parameter, where a smaller time-scale parameter may change over a shorter period such as a dynamic scheduling period (10 ms or less for example), and thus is a more dynamic parameter. Second-level power control modeling and channel-specific parameters may be applied in addition to or on top of large time-scale parameters, to vary transmit power with one or more desired targets, such as an expected receiver signal strength or a block error rate (BLER) at a target value such as 0.5% or 1% or within a target range, for fast and dynamic fine tuning of transmit power control, for example. Transmit power control as disclosed herein may also provide or support other power control parameters or techniques, for closed loop power control for example.

In some embodiments, uplink transmit power control is associated primarily with four additive components and one RS part or sub-component. An example, which may be additionally limited by communication device maximum power, is as follows:

$$P_{Tx}(i) = \{P_{r\_0}\} + \{\alpha\} * PL + Offset_{\_channel} + clpc\_(i)$$

where
  $P_{Tx}(i)$ denotes transmit power at a time instant i; and
  $\{\bullet\}$ denotes a parameter having a set of configuration values, with each value possibly being identified or indicated by an index or other identifier.

This example includes large time-scale power control parameters $\{P_{r\_0}\}$ (expected received power levels) and $\{\alpha\}$ (path loss compensations or compensation factors, which may include values of 0 and 1). $\{P_{r\_0}\}$ is an example of an additive component, and $\{\alpha\} * PL$ is another additive component in which sub-components $\{\alpha\}$ and (PL) are multiplied, where PL is the path-loss of signal propagation from a network device, such as a base station, to a communication device, such as a UE.

Small time-scale power control parameters in this example include one or more parameters based upon which a per-channel and channel-specific offset, Offset_channel, may be determined or otherwise obtained. Such parameters may include one or more conditions or characteristics such as channel bandwidth, MCS, channel format, etc. Such conditions or characteristics, or more generally parameters, may be included in or otherwise indicated in signaling. For example, either or both of a number of RBs and deltaMCS may be included in dynamic scheduling. Another small time-scale parameter in this example is clpc_(i), which is a closed loop power control (CLPC) component in a time instant of i, associated with a CLPC strategy. Offset_channel and clpc_(i) are also additive components in this example, for a total of four additive components as referenced above.

PL in this example is dependent on radio propagation environment between a communication device and a network device, and can be estimated by the communication device. PL estimation may be based on an RS part or sub-component that is dependent upon an RS configuration, among possibly multiple RS configurations, from the network device. For example, PL may be estimated at a communication device based on an RS, such as synchronization signal block (SSB) or channel state information-reference signal (CSI-RS), and can be CC-dependent or cell-dependent. SSB may have different beam directions, such as eight different beam directions for example, and each beam direction may have an SSB and/or be associated with a CSI-RS. Thus, different {SSB/CSI-RS} can be common for all uplink channels of a communication device, at least some of expected received signal levels for $\{P_{r\_0}\}$ may be associated with one beam direction and can be applicable to any uplink channel, and $\{\alpha\}$ has multiple possible values, including 0 and 1 in some embodiments, that may be common across different uplink channels.

The expression for $P_{Tx}(i)$ provided above is an example of a baseline or reference power control model that may be suitable for AI-based training or simulated optimization. In training or optimization on such a reference power control model, for example, large time-scale parameters common to multiple uplink channels may be considered. As an example, for $P_{Tx}(i) = \{P_{r\_0}\} + \{\alpha\} * PL$, one or more pairs $\{P_{r\_0}, \alpha\}$ may be determined from the training or optimization procedure, and then power control can be performed for each individual uplink channel by applying channel-specific adjustments, such as channel-specific offsets Offset_channel and/or dynamic power adjustment clpc_(i).

In some embodiments, there is optimization or training on the large time-scale parameters, and the following example relates to optimization or training for $P_{r\_0}$ and $\alpha$. This is a parameter optimization for the first-level or high-level reference power control model on (at least) large time-scale parameters $\{P_{r\_0}$ and $\alpha\}$ for a given carrier frequency or carrier component CC1. An optimization procedure on these parameters may be done as follows: for example, for any given UE location in a cell or coverage area, a UE may be able to measure path loss based on a reference signal from a network node or device (such as a base station), and transmit signals at predefined different levels of power to the network node. The network node may then be able to measure the received signal power levels $\{P_{r\_0}\}$. This procedure can be done for more than one UE location, and may involve more than one UE. Given the transmission power levels and the measurements, a best curve fitting can be done to obtain trained or optimized parameters $\{P_{r\_0}$ and $\alpha\}$ based on the following reference model:

$$P_{Tx\_ref}(positioning) = \{P_{r\_0}\} + \{\alpha\} * PL(position)$$

where
  for a given UE location (positioning), $P_{Tx\_ref}(positioning)$ denotes the predefined transmit powers in the UE location;
  PL(position) denotes measured signal strength(s) from an RS, such as SSB or CSI-RS, at the UE location—UE location information or positioning can be obtained in accordance with positioning procedures or sensing procedures, for example;

the power levels for $P_{Tx\_ref}$(positioning) and PL(position) can be measured in one-RB frequency resource and be per-RB power levels in some embodiments;

$\{P_{r\_0}\}$ and $\{\alpha\}$ denote best fit or most likely paired parameters from the above optimization procedure, which could be a function of UE location (positioning) in a cell or coverage area, or could be independent of UE locations by fitting the two parameters over all the measured UE locations—in some cases, the optimized parameters $\{P_{r\_0}\}$ and $\{\alpha\}$ can be very close among different UE locations.

In some embodiments, the baseline training can be done by AI or deep learning using a neural network model, for example. In this case, a wireless network may resort to a power control AI model to train and obtain one or more large time-scale parameters including $\{P_{r\_0}\}$ and $\{\alpha\}$ in the above example. The training can be done, for example, by providing the AI model one or more sets of training inputs. A set of training inputs may be based on one UE location, for example, and may include UE location, UE measured PLs, UE transmission powers, and corresponding received signal power levels at the base station. The optimized fitting procedure can be done here by the power control related AI model via training on these inputs.

Thus, training may be used in some embodiments to determine or otherwise obtain a set of optimized pairs of $\{P_{r\_0}\}$ and $\{\alpha\}$. It is noted that these optimized parameters $\{P_{r\_0}\}$ and $\{\alpha\}$ appear to be a function of physical position or environment in this optimization example, but are not necessarily dependent upon any specific communication device that participated in training. These parameters could therefore be applied to power control for other communication devices, and be within a certain deterministic offset for any other communication device UE that uses a different CC and/or a different constrained maximum power, for example.

In some embodiments, a base station or another device in a network may initiate training or optimization by transmitting a request or command to an AI agent or module to train and provide optimized power control parameters, such as a set of optimized pairs of $\{P_{r\_0}\}$ and $\{\alpha\}$ in examples above, for one or more UEs. Training inputs and one or more optimization criteria may also be provided to the AI agent. Note that training inputs or datasets related to different AI models could be different. As a result, to obtain training data and provide optimized power control parameters, such as a set of optimized pairs of $\{P_{r\_0}\}$ and $\{\alpha\}$, the AI agent may indicate to the network device(s) and/or communication device(s) the training inputs that it requires, or indicate directly the procedure(s) to be followed by one or more network devices and one or more communication devices such as UEs to collect the training inputs. Training input collection procedures may also or instead be based on configuration, which may be signaled to the network device(s) and/or to the communication device(s) by the AI agent or by another device in the network. In other embodiments, the AI agent might not need to request or otherwise obtain training inputs from the network device(s) and/or communication device(s). For example, an AI agent may have self-contained mechanisms to obtain the training data or use historical datasets for AI training and provide optimized power control parameters, such as a set of optimized pairs of $\{P_{r\_0}\}$ and $\{\alpha\}$ in this case.

For training input collection, a communication device measures path loss from an RS, reports the path loss measurement, and optionally reports its position, although a network device may be able to determine communication device position in other ways. The communication device also transmits signals at different levels of power. These different power levels may be reported to the network device, or be pre-defined and known at the network device. The network device then measures received signal power, and can collect or compile a dataset including a communication device position, PL measurement, transmission power(s), and network device measured received signal power level(s). Such a process can be performed for different positions, and/or with one or more UEs. In an AI agent embodiment, a network device sends one or more datasets to the AI agent for AI training, and after training is completed in an AI model, such as after a certain number of training inputs or datasets have been collected or after another training or model convergence criterion has been satisfied, a set of optimized parameters can be sent to the network device and then on to one or more communication devices for reference power control model.

For a specific uplink channel and transmission occasion i, second-level power control modeling, based on a first-level reference model in combination with one or more small time-scale and dynamic parameters and potentially other channel specific factors, is used in some embodiments to obtain transmit power for a CC. For example, in an embodiment:

$$P_{Tx}(i) = \{P_{r\_0}\} + \{\alpha\} * PL + \text{Offset}_{\_channel} + clpc\_(i)$$

where $\{P_{r\_0}\}$ and $\{\alpha\}$ are configured based on optimization from reference (or averaged) transmit power control modelling $P_{Tx\_ref}$(positioning);

clpc\_(i) is closed loop power control component in a time instant of i, and may be initialized to 0; and $\text{Offset}_{\_channel}$ is a per-channel and channel-specific uplink channel specific offset that is dependent upon the particular uplink channel.

$\text{Offset}_{\_channel}$ may encompass or model impacts of dynamic small time-scale parameters or factors such as MCS, and/or large time-scale parameters or factors such as scheduled frequency bandwidth or different carrier frequency bands or CCs (27 GHz band for PUSCH and below 6 GHz band for PUCCH, for example). illustrative and non-limiting examples of $\text{Offset}_{\_channel}$ include the following:

for PUSCH with a first CC, CC1, $\text{Offset}_{\_channel}$ is based on one or more of: large time-scale offset that varies for different CCs for example, and smaller time-scale offset due to channel bandwidth, numerology, and/or deltaMCS for example;

for PUCCH with a second CC, CC2, $\text{Offset}_{\_channel}$ is based on one or more of: large time-scale offset that varies for different CCs for example, and smaller time-scale offset due to channel format, bandwidth, numerology, and/or deltaMCS for example;

for SRS with a third CC, CC3, $\text{Offset}_{\_channel}$ is based on one or more of: large time-scale offset that varies for different CCs for example, and smaller time-scale offset due to channel bandwidth and/or numerology for example;

for SRS with a fourth CC, CC4, $\text{Offset}_{\_channel}$ is based on one or more of: large time-scale offset that varies for different CCs and full path loss compensation with a path loss compensation factor of $\alpha=1$ for example, and smaller time-scale offset due to channel bandwidth and/or numerology for example.

Offset$_{channel}$ is illustrative of an uplink channel-specific offset that may be applied to multi-channel baseline power control modeling for multiple uplink channels, to provide transmit power control for a particular uplink channel. Such an offset may be dependent upon or based on any one or more of the following factors, for example:

the particular uplink channel for which transmit power is to be determined, which may impact the factor(s) that are taken into account for Offset_channel;

communication device maximum power Pmax, which may depend on one or more of device power class type, CCs, carrier frequency bands, and use situations or scenarios, for example, and may be predefined or configured using RRC signaling or other signaling;

channel differentiation—a channel differentiation offset may be due to, for example, any one or more of: receive reliability differences between different channels, different encoding and decoding schemes, different frequency channel characteristics where different channels may be transmitted in different frequency resources, etc.;

carrier frequency band, or CC—for example, a CC may be different from the CC(s) used in baseline reference power control modeling and may lead to a certain expected PL difference for a communication device operating environment relative to using another CC at the same distance from a BS or the same location—as a particular example, an offset due to different CCs may be denoted CC offset(cc, reference to cc0), where cc may include F1 band, F2 band, high-end mmWave band, Terahertz band, or any other deployable CC, reference cc0 denotes a CC used in a baseline or reference power control model, and CC offset may be predefined or configured using RRC signaling or other signaling;

network node type, such as TN, NTN, drone, unmanned aerial vehicle (UAV), integrated access backhaul (IAB), etc.—for example, a net network node type offset due to connection with an NTN, drone, unmanned aerial vehicle, integrated access backhaul (IAB), or other type of node versus a TN node, may be predefined or configured using RRC signaling or other signaling;

application or service type, such as ultra-reliable low latency communications (URLLC), URLLC+, enhanced mobile broadband (eMBB), eMBB+, massive machine type communications (mMTC), mMTC+, healthcare, virtual reality (VR), holographic, etc., to determine one or more power control criteria or offsets due to different application or service requirements that may include, for example, expected received signal strength, a BLER threshold, latency, etc.;

channel format—uplink channels may have different formats, in terms of symbols used for example, and therefore different channel format offset values can be estimated depending on channel format details—as an example, different numbers of symbols per slot for an uplink channel that is to be used may impact encoding schemes on an uplink channel with channel type including PUSCH, PUCCH, SRS, PRACH, or any other uplink channel, and channel format offset due to number of symbols may be consistent with a predefined formulation and tabulated, or configured using RRC signaling or other signaling to populate a table or one or more parameters in a formulation for calculating channel format offset;

channel bandwidth and/or numerology, with an offset value being determined as $10 \log_{10}(2^{\mu}*$channel bandwidth in number of RBs) at transmission occasion j, for example;

more generally, a channel or transmission bandwidth offset or RB offset due to different scheduled bandwidths, such as different numbers of RBs being scheduled for an uplink channel, may be consistent with a predefined formulation and tabulated, or configured using RRC signaling or other signaling to populate a table or one or more parameters in a formulation for calculating a bandwidth offset;

similarly a numerology offset may be determined or used separately from a channel bandwidth offset—as an example, numerology may include subcarrier spacing (SCS) type (such as 30 kHz, 60 kHz, or 120 kHz) with normal or extended cyclic prefix (CP), and may be consistent with a predefined formulation and tabulated, or configured using RRC signaling or other signaling to populate a table or one or more parameters in a formulation for calculating a numerology offset;

MCS—an example of an MCS-related offset due to different MCSs used during transmission is referenced herein as $\Delta_{TF}$, and may be determined for a PUSCH transmission opportunity i with encoded bits per RE (BPRE) according to $$\Delta_{TF}(i) = 10\log_{10}\left(\left(2^{(BPRE*Ks)} - 1\right)\beta_{offset}^{PUSCH}\right)$$

when Ks=1.25 and $\Delta_{TF}(i)$=0 when Ks=0, where Ks and $$\beta_{offset}^{PUSCH}$$

are channel specific parameters for PUSCH in this example, that are provided in higher layer signaling—in other embodiments an MCS-related offset may be based on RRC configuration and/or other signaling to populate a table or one or more parameters in a formulation for calculating an MSC-related offset;

multiple-link configuration—in a multiple-link offset(Pmax1, Pmax2, . . . ), for example, for simultaneous transmission any or all {Pmaxi} may be adjusted such that a sum of linear values of {Pmaxi} is less than or equal to Pmax of a communication device, and any such adjustment that affects an individual channel transmitted over a link can be applied to power control for that channel—transmission powers may be scaled down, such as proportionally, for each link for example;

offset for MIMO/beams—multiple uplink channels may be active in, for example, different beams with MIMO operations, and/or different frequency bands, thus comparing to the baseline or reference power control modelling beam assumption, an offset due to different beam characteristics may be considered for compensation in transmission power control—this is also referred to herein as active beam direction or MIMO with active beam direction.

These are examples of factors or criteria based upon which a per-channel or channel-specific offset, to adjust a common, base, or reference transmit power for a particular uplink channel, may be determined. Some of these factors, such as numerology, transmission bandwidth, MCS, channel format, and multiple-link configuration are examples of dynamic communication parameters, and these examples also include other factors that may be used to estimate or otherwise obtain a channel-specific offset. These examples are not exhaustive, and others may be or become apparent to those skilled in the art.

In general, an uplink channel-specific offset may be or include an offset such as Offset_channel, which may have a value based on any one or more of various factors, such as a sum of offset values due to each of multiple factors, also referenced herein as factor offsets. The offset value due to any one factor can be estimated based on a formulation or analytical relationship, for example, and may be tabulated, or configured using RRC signaling or other signaling to populate a table or one or more parameters in a formulation for calculating a factor offset. These options are referenced in several of the factor offset examples listed above, but are not limited only to those examples.

In some embodiments, one or more individual factor offsets, such as any of the examples listed above, are tabulated into a lookup table that is stored at a communication device. Table 1 below is an example of such a lookup table.

TABLE 1

Example Factor Offset Lookup Table

| Parameter | PUSCH | PUCCH | SRS | PRACH | Reference point |
|---|---|---|---|---|---|
| numero-logy | Offset value(s) due to different subcarrier spacing(s) (example: 15, 30, 60 KHz) | Offset value(s) due to different subcarrier spacing(s) (example: 15, 30, 60 KHz) | Offset value(s) due to different subcarrier spacing(s) (example: 15, 30, 60 KHz) | Offset value(s) due to different subcarrier spacing(s) (example: 15, 30, 60 KHz) | Offset value(s) may be based on reference numerology or subcarrier spacing, (example: 15 kHz) |
| MCS | Offset value(s) due to different MCS(s) | Offset value(s) due to different MCS(s) | Offset value(s) due to different MCS(s) | Offset value(s) due to different MCS(s) | Offset value(s) may be based on reference MCS |
| # of RB | Offset value(s) due to different number(s) of RBs used/ scheduled | Offset value(s) due to different number(s) of RBs used/ scheduled | Offset value(s) due to different number(s) of RBs used/ scheduled | Offset value(s) due to different number(s) of RBs used/ scheduled | Offset value(s) may be based on reference # of RB (example: 1 RB) |
| Channel format | Offset value(s) due to different channel format(s) used/ scheduled | Offset value(s) due to different channel format(s) used/ scheduled | Offset value(s) due to different channel format(s) used/ scheduled | Offset value(s) due to different channel format(s) used/ scheduled | Offset value(s) may be based on one reference channel type (example: 2-symbol channel |

TABLE 1-continued

Example Factor Offset Lookup Table

| Parameter | PUSCH | PUCCH | SRS | PRACH | Reference point |
|---|---|---|---|---|---|
| Carrier frequency band | Offset value(s) due to different carrier frequency band(s) used/ scheduled | Offset value(s) due to different carrier frequency band(s) used/ scheduled | Offset value(s) due to different carrier frequency band(s) used/ scheduled | Offset value(s) due to different carrier frequency band(s) used/ scheduled | Offset value(s) may be based on one reference frequency band (example: 6 GHz or any other band) |

Relationships between offset values or factor offsets and baseline power control parameters may be modeled, for example, by AI, testing, analysis, trials, etc. Offset values may be tabulated, into one or more tables, and used in conjunction with conditions or rules to follow in determining or obtaining the offset values that are to be used for particular uplink channels. For example, there may be a factor offset lookup table for each uplink channel, or a lookup table may store factor offsets for multiple uplink channels. In Table 1 above, types of factor offsets are listed in the first column, and one or more corresponding offset values for each of multiple different uplink channels are listed in each row. Table 1 also identifies a reference point for each parameter or factor. Baseline or reference power control modelling may have been developed using a certain value for each parameter, and these values are identified in Table 1 as reference points. Considering numerology as an example, with a reference point of 15 kHz SCS, Table 1 could include a numerology offset value of 0 for an uplink channel that uses the reference point numerology, or not include an offset value for that numerology. More generally, a 0 offset value or no offset value may be included in a lookup table or used in transmit power control for a factor or parameter that matches a factor or parameter of a baseline or reference power control model.

Table 1 and earlier examples of factor offsets are intended solely for illustrative purposes. Other factors may also or instead be taken into account in determining or obtaining per-channel offsets or adjustments that are to be applied in transmit power control.

Other offset considerations and/or configurations may also or instead be used in other embodiments. For example, the second-level power control model example provided above also includes a closed loop power control term clpc(i). An example for PUSCH is as follows:

$$clpc\_(i) = clpc(i-1) + \text{delta}\_{PUSCH}$$

where delta$_{PUSCH}$(*) is a transmit power control (TPC) command, carried by DCI format 0 or DCI format 3/3a, for example; a TPC command can be an absolute value or indication where cplc_(i) is equal to a target power, or a relative power step or target power adjustment toward target power based on the TCP command.

Figure 5:
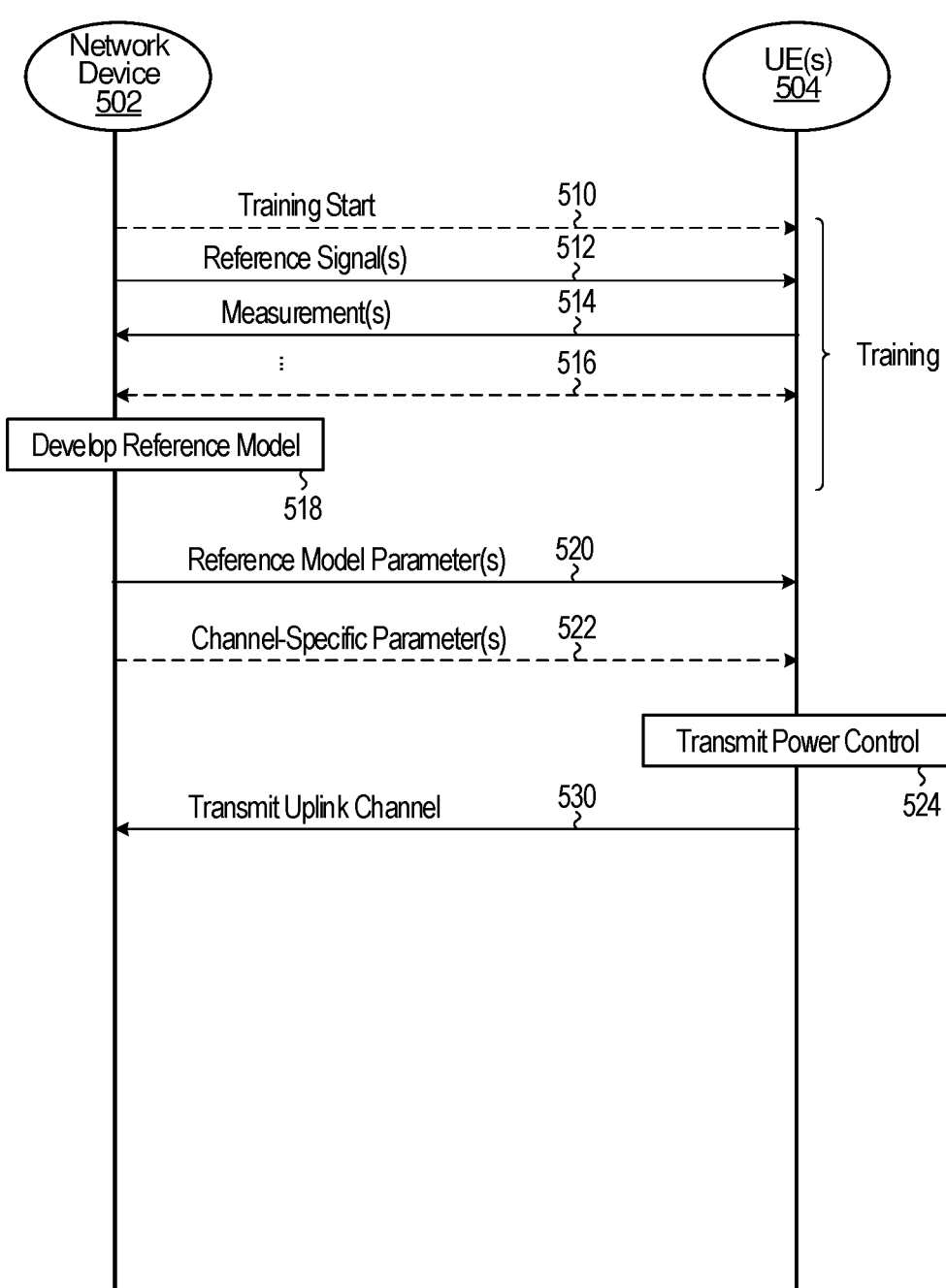
FIG. 5 is a signal flow diagram illustrating operations according to an embodiment.

FIG. 5 is a signal flow diagram illustrating operations according to an embodiment. FIG. 5 illustrates a training procedure or phase during which a reference power control model is developed. During training, at 510 a network device 502 may transmit signaling that is received by one or more communication devices, shown by way of example as UE(s) 504. The signaling at 510 indicates a start of training to the UE(s) 504. End of training signaling may also or instead be transmitted by the network device 502 to the UE(s) 504, but has not been shown in FIG. 5 in order to avoid further congestion in the drawing. A start of training and/or an end of training need not be explicitly signalled or separately signaled in all embodiments. For example, a reference signal that is transmitted by a network device and received by a UE 504 may include an indication that the reference signal is part of a training phase, or an end of training may be inferred by a UE 504 when it receives one or more reference model parameters from a network device. Training may also or instead be performed periodically or otherwise at pre-determined times that are known to UE(s), in which case training start and end need not be signaled.

In the example shown in FIG. 5, training sample collection involves the network device 502 transmitting one or more reference signals to the UE(s) 504 at 512, the UE(s) receiving the reference signal(s), performing measurements, and transmitting measurement results to the network device at 514, and the network device receiving the measurement results and developing the reference power control model at 518. Multiple rounds or cycles of reference signals and measurement results are illustrated in FIG. 5 by the dashed line 516.

Any of various criteria may be used to declare convergence of the reference power control mode or otherwise determine that a current round of training is complete. One or more parameters of the reference model may then be transmitted by the network device 502 and received by one or more UEs 504 at 520. One or more channel-specific parameters may also be transmitted by the network device 502 and received by one or more UEs 504 at 522. It should be noted that the reference model parameter(s) and/or the channel-specific parameter(s) need not necessarily be transmitted to and received by only the UE(s) that participated in the training. A reference power control model that is developed based on training with certain UEs may be applied in transmit power control by other UEs.

Transmit power control is illustrated in FIG. 5 at 524, and uses the reference model and one or more channel-specific parameters. A UE 504 determines that a particular uplink channel is to be transmitted, and uses the power control reference model and channel-specific parameters to determine transmit power for that channel. The determination as to the channel that is to be transmitted may be based on scheduling, for example, although other criteria may also or instead be taken into account in determining the particular channel that his to be transmitted. The reference power control model and offsets for the particular channel that is to be transmitted are applied to determine transmit power for the channel. For example, based on the particular uplink channel to be transmitted and the settings or configuration to be used, the applicable offsets may be read from a lookup table such as Table 1, or otherwise determined, and used in transmit power control.

For transmit power control at 524, obtaining base or reference transmit power according to the reference power control model may involve selecting between values of large time scale parameters, such as $P_{r\_0}$ and $\alpha$ in some of the examples provided herein. Such parameters can be a function of position, at a time instant for a moving communication device, for example, and a communication device may determine current position according to positioning or sensing procedures and select parameter values for the reference power control model based on the current position. In some embodiments, reference power control model parameters that are common to multiple uplink channels can be independent of position, if those parameters are trained that way or are averaged over various positions for example. In such embodiments, one or more of the power control parameters that are common to multiple channels may be fixed or selected based on conditions or characteristics other than current position or time of transmission.

The UE may estimate an offset value in the reference model formulation for a specific uplink channel based on the channel-specific power control parameter(s) such as MCS, scheduled frequency bandwidth (number of RBs, for example), etc. Such parameters themselves might not be determined by a UE, but rather determined and configured by a network device such as a BS and transmitted to the UE via other signaling at 522, such as dynamic DCI scheduling or in a semi-static way via RRC signaling as another embodiment, for example. Channel-specific power control parameters may be or include a set of communication parameters to be used in transmitting an uplink channel, and based on such parameters corresponding offset values for transmit power control can be determined or otherwise obtained by the UE. Offset values may be determined or obtained based on channel-specific power control parameters, for example, by calculating offset values from pre-defined formulas and/or looking up offset values for channel-specific power control parameters in a lookup table.

Transmit power control may also or instead involve other adjustments to baseline or reference transmit power according to a reference model. An example is a closed loop power control term such as clpc_(i) referenced above, based on a TPC command in signaling that is received by a communication device such as a UE.

Transmission of an uplink channel, at the determined transmit power, is shown in FIG. 5, at 530. Although FIG. 5 explicitly illustrates transmission of one uplink channel at 530, in other embodiments one or more other channels may also be transmitted, at respective transmit powers that are based at least in part on the common transmit power control parameter(s) used to determine transmit power for the uplink channel that is transmitted at 530. Transmit power for each other channel may also be based on one or more transmit power control parameters specific to the channel.

FIG. 5 illustrates various features that may be provided in some embodiments. For example, a method performed by a communication device such as a UE may involve receiving a first transmit power control parameter that is common to transmit power control for multiple different physical uplink channels. This signaling can be RRC or semi-static signaling, and can also include or instead be dynamic signaling such as DCI scheduling to include such a parameter. Such signaling is shown by way of example at 520 in FIG. 5. DCI scheduling via PDCCH, for example, is illustrative of physical layer signaling that may be used to signal parameters in some embodiments.

A transmit power control parameter that is common to transmit power control for multiple different physical uplink channels, referenced above as a first transmit power control parameter, may be a large time-scale parameter. Examples include an expected received power parameter such as $P_{r\_0}$ and a path loss compensation factor such as $\alpha$, either or both of which may be used in some embodiments.

A method may also involve transmitting, by a communication device such as a UE, one of multiple different physical uplink channels at a transmit power that is based on the first transmit power control parameter and a second transmit power control parameter that is specific to the transmit power control for the one of the multiple different physical uplink channels that is being transmitted. A transmit power control parameter that is specific to transmit power control for a particular physical uplink channel is also referred to herein as a channel-specific parameter, and may include one or more small time-scale parameters. Other channel-specific parameters, which may but need not necessarily be small time-scale parameters, may also or instead be used in transmit power control for a particular physical uplink channel.

More generally, channel-specific parameters may include one or more parameters of a set of dynamic communication parameters and a set of other factors that are used to estimate a channel-specific offset. A set of dynamic communication parameters may include, for example, one or more of the following: numerology; transmission bandwidth; MCS; channel format; multiple-link configuration; and MIMO with active beam direction. A set of other factors may include, for example, one or more of the following: channel differentiation; carrier frequency; network node type; application type; and MIMO with active beam direction. MIMO with active beam direction is provided as an example of both dynamic communication parameters and other factors. This illustrates that such sets of parameters and factors are not necessarily exclusive. For MIMO with active beam direction, beam direction can be dynamically changed and signaled or indicated in some cases, for fast-moving mobile communication devices for example, or semi-statically changed and signaled or indicated, for slow-moving mobile communication devices for example. Other parameters or factors may also or instead fall into different categories in respect of how quickly or often they may change.

These are illustrative examples of channel-specific parameters. Others may be or become apparent.

A transmit power control parameter that is specific to transmit power control for a particular physical uplink channel, also referenced above as a second transmit power control parameter, may be provided to a UE by a network device. A method may therefore also include receiving, by a UE, the second transmit power control parameter. Transmitting a channel may then involve transmitting one of the multiple different physical uplink channels after receiving the second transmit power control parameter, at 522 in FIG. 5 for example. Receiving a second transmit power control parameter may involve receiving the second transmit power control parameter in network signaling. Such network signaling may be or include, for example, one or more of physical layer signaling and RRC signaling.

Transmit power control for multiple different physical uplink channels may be consistent with or otherwise associated with a reference model that is based on the first transmit power control parameter and the second transmit power control parameter. In the following example of a reference model that is also provided above:

$$P_{Tx}(i)=\{P_{r\_0}\}+\{\alpha*PL+\text{Offset}_{\_channel}+clpc\_(i),$$

$P_{r\_0}$ and $\alpha$ are examples of a first transmit power control parameter that is common to transmit power control for multiple different physical uplink channels, and PL, Offset$_{\_channel}$, and clpc_(i) are examples of adjustments or offsets that are based on second, channel-specific transmit power control parameters specific to transmit power control for individual ones physical uplink channels. Thus, in some embodiments, receiving the first transmit power control parameter may involve receiving parameter values for $\{P_{r\_0}\}$ and $\{\alpha\}$, and Offset$_{\_channel}$ is determined based on the second transmit power control parameter. PL, which may be measured by a UE based on one or more reference signals, is an example of a power transmit control parameter or term that may be measured by a UE or may be based on a measurement by the UE. The clpc_(i) is also intended as an illustrative example, of a channel-specific term that may be received by a UE, or may be determined or otherwise obtained based on a command or other channel-specific signaling that is received by a UE. For this particular example of clpc_(i), and method may involve receiving a TPC command that includes or otherwise indicative of a value for clpc_(i).

Other features may also or instead be implemented or provided in method embodiments. For example, a method may involve transmitting training data from the UE to a network device in the wireless communication network, in which case the first parameter may be determined by the network device based on the training data. This is illustrated by way of example at 514, 518 in FIG. 5.

Another example of a feature that may be provided in some method embodiments is transmitting, by the UE, a further one of the multiple different physical uplink channels at a further transmit power that is based, at least in part, on the first transmit power control parameter. Transmit power at which a further physical uplink channel is transmitted may also be based on a further transmit power control parameter that is specific to the transmit power control for the further physical uplink channel.

More generally, the same common transmit power control parameter, and optionally respective different transmit power control parameters specific to particular channels, may be applied in determining or otherwise obtaining transmit power for multiple physical uplink channels. It is also noted that features disclosed herein with reference to one physical uplink channel, for example, may be applied to one or more other physical uplink channels.

Embodiments may also or instead be implemented in any of various applications. For example, transmit power control as disclosed herein may be applied to different physical uplink channels that include any one or more of: PUSCH, PUCCH, SRS, and PRACH.

The example methods described above relate primarily to operations performed at a communication device such as a UE. Other embodiments are also possible.

As an example, a method performed by a network device may involve transmitting, by a network device to a UE in a wireless communication network, a first transmit power control parameter that is common to transmit power control at the UE for multiple different physical uplink channels; and receiving, by the network device from the UE, one of the multiple different physical uplink channels. That uplink channel is transmitted by the UE at a transmit power that is based on the first transmit power control parameter and a second transmit power control parameter that is specific to the transmit power control for the one of the multiple different physical uplink channels.

Features disclosed elsewhere herein, or similar to those disclosed elsewhere herein, may be implemented in such a method. These features include, for example, any of the following, alone or in any of various combinations:

the first transmit power control parameter is or includes a large time-scale parameter;

the large time-scale parameter is or includes one or both of: an expected received power parameter and a path loss compensation factor;

the second transmit power control parameter is or includes a channel-specific parameter;

the channel-specific parameter is or includes one or more parameters of a set of dynamic communication parameters and a set of other factors that are used to estimate a channel-specific offset;

the set of dynamic communication parameters includes one or more of: numerology; transmission bandwidth; MCS; channel format; multiple-link configuration; and MIMO with active beam direction;

the set of other factors includes one or more of: channel differentiation; carrier frequency; network node type; application type; and MIMO with active beam direction;

the transmit power control for the multiple different physical uplink channels is associated with a reference model that is based on the first transmit power control parameter and the second transmit power control parameter;

the reference model for transmit power is as follows:

$$P_{Tx}(i)=\{P_{r\_0}\}+\{\alpha\}*PL+\text{Offset}_{\_channel}(i)+clpc\_(i);$$

the transmitting involves transmitting parameter values for $\{P_{r\_0}\}$ and $\{\alpha\}$;

PL is measured by the UE based on one or more reference signals;

$\text{Offset}_{\_channel}$ is determined by the UE based on the second transmit power control parameter;

the method also involves receiving a TPC command that includes or otherwise is indicative of a value for clpc\_(i);

the method also involves receiving, by the network device, training data from the UE;

the method also involves determining, by the network device, the first parameter based on the training data;

the multiple different physical uplink channels include any one or more of: PUSCH, PUCCH, SRS, and PRACH;

transmitting the first transmit power control parameter involves transmitting the first parameter in RRC signaling;

the method also involves transmitting, by the network device to the UE, the second transmit power control parameter;

receiving the one of the multiple different physical uplink channels involves receiving the one of the multiple different physical uplink channels after transmitting the second transmit power control parameter;

transmitting the second transmit power control parameter involves transmitting the second transmit power control parameter in network signaling;

the network signaling is or includes one or more of physical layer signaling and RRC signaling.

As described at least above, one or more other physical uplink channels may be transmitted at respective transmit powers based on at least a common power control parameter, and accordingly a method performed by a network device receiving, by the network device from the UE, a further one of the multiple different physical uplink channels transmitted by the UE at a further transmit power that is based on the first transmit power control parameter, and optionally one or more transmit control parameters specific to transmit power control for the further channel.

Many of the foregoing embodiments relate to example methods. Embodiments may also or instead be embodied in other forms, including apparatus and non-transitory computer readable storage media, for example.

A non-transitory computer readable storage medium, for example, may store programming for execution by a processor. Such a storage medium may comprise a computer program product, or be implemented in an apparatus that also includes at least one processor coupled to the storage medium.

Processors 210, 260, 276 and storage media in the form of memory 208, 258, 278 are shown by way of example in FIG. 3. Thus, apparatus embodiments may include an ED as shown by way of example at 110 in FIG. 3, and a network device such as a T-TRP as shown by way of example at 170 in FIG. 3 and/or an NT-TRP as shown by way of example at 172 in FIG. 3. In some embodiments, an apparatus may include other components, such as a communication interface to which a processor is coupled. A communication interface may include elements such as those shown at 201/203/204, 252/254/256, and/or 272/274/280 in FIG. 3. These are illustrative examples of apparatus, and other apparatus embodiments are possible.

In an embodiment, programming stored in a computer-readable storage medium, whether implemented as a computer program product or in an apparatus such as a UE, may include instructions to, or to cause the processor or apparatus to: receive a first transmit power control parameter that is common to transmit power control for multiple different physical uplink channels, and transmit one of the multiple different physical uplink channels at a transmit power that is based on the first transmit power control parameter and a second transmit power control parameter that is specific to the transmit power control for the one of the multiple different physical uplink channels.

Features disclosed elsewhere herein, or similar to those disclosed elsewhere herein, may be implemented in such apparatus and/or computer program product embodiments. These features include, for example, any of the following, alone or in any of various combinations:

the first transmit power control parameter is or includes a large time-scale parameter;

the large time-scale parameter is or includes one or both of: an expected received power parameter and a path loss compensation factor;

the second transmit power control parameter is or includes a channel-specific parameter;

the channel-specific parameter is or includes one or more parameters of a set of dynamic communication parameters and a set of other factors that are used to estimate a channel-specific offset;

the set of dynamic communication parameters includes one or more of: numerology; transmission bandwidth; MCS; channel format; multiple-link configuration; and MIMO with active beam direction;

the set of other factors includes one or more of: channel differentiation; carrier frequency; network node type; application type; and MIMO with active beam direction;

the transmit power control for the multiple different physical uplink channels is associated with a reference model that is based on the first transmit power control parameter and the second transmit power control parameter;

the reference model for transmit power is as follows:

$$P_{Tx}(i)=\{P_{r\_0}\}+\{\alpha\}*PL+\text{Offset}_{\_channel}+clpc\_(i);$$

the instructions to receive include instructions to receive parameter values for $\{P_{r\_0}\}$ and $\{\alpha\}$;

PL is measured by the UE based on one or more reference signals;

$\text{Offset}_{\_channel}$ is determined based on the second transmit power control parameter;

the programming further includes instructions to receive a transmit power control (TPC) command comprising a value for clpc_(i);

the programming further includes instructions to transmit training data from the UE to a network device in the wireless communication network;

the first parameter is determined by the network device based on the training data;

the multiple different physical uplink channels include any one or more of: PUSCH, PUCCH, SRS, and PRACH;

the instructions to receive the first power control parameter include instructions to receive the first power control parameter in one or more of RRC signaling and physical layer signaling;

the programming further includes instructions to receive, by the UE, the second transmit power control parameter;

the instructions to transmit the one of the multiple different physical uplink channels include instructions to transmit the one of the multiple different physical uplink channels after receiving the second transmit power control parameter;

the instructions to receive the second transmit power control parameter include instructions to receive the second transmit power control parameter in network signaling;

the network signaling is or includes one or more of physical layer signaling and RRC signaling;

the programming further includes instructions to transmit a further one of the multiple different physical uplink channels at a further transmit power that is based on the first transmit power control parameter.

Apparatus or storage medium embodiments relate to a network device for a wireless communication network are also possible. Programming stored in a non-transitory computer readable storage medium may include instructions to: transmit, to a UE from a network device, a first transmit power control parameter that is common to transmit power control at the UE for multiple different physical uplink channels; and receive, by the network device from the UE, one of the multiple different physical uplink channels transmitted by the UE at a transmit power that is based on the first transmit power control parameter and a second transmit power control parameter that is specific to the transmit power control for the one of the multiple different physical uplink channels.

Features disclosed elsewhere herein, or similar to those disclosed elsewhere herein, may be implemented in network device apparatus and/or computer program product embodiments. These features include, for example, any of the following, alone or in any of various combinations:

the first transmit power control parameter is or includes a large time-scale parameter;

the large time-scale parameter is or includes one or both of: an expected received power parameter and a path loss compensation factor;

the second transmit power control parameter is or includes a channel-specific parameter;

the channel-specific parameter is or includes one or more parameters of a set of dynamic communication parameters and a set of other factors that are used to estimate a channel-specific offset;

the set of dynamic communication parameters includes one or more of: numerology; transmission bandwidth; MCS; channel format; multiple-link configuration; and MIMO with active beam direction;

the set of other factors includes one or more of: channel differentiation; carrier frequency; network node type; application type; and MIMO with active beam direction;

the transmit power control for the multiple different physical uplink channels is associated with a reference model that is based on the first transmit power control parameter and the second transmit power control parameter;

the reference model for transmit power is as follows:

$$P_{Tx}(i) = \{P_{r\_0}\} + \{\alpha\} * PL + Offset_{\_channel}(i) + clpc\_(i),$$

the instructions to transmit include instructions to transmit parameter values for $\{P_{r\_0}\}$ and $\{\alpha\}$;

PL is measured by the UE based on one or more reference signals;

$Offset_{\_channel}$ is determined by the UE based on the second transmit power control parameter;

the programming further includes instructions to receive a transmit power control (TPC) command comprising a value for clpc_(i);

the programming further includes instructions to receive training data from the UE;

the programming further includes instructions to determine the first parameter based on the training data;

the multiple different physical uplink channels include any one or more of: PUSCH, PUCCH, SRS, and PRACH;

the instructions to transmit the first transmit power control parameter include instructions to transmit the first parameter in RRC signaling;

the programming further includes instructions to transmit, to the UE, the second transmit power control parameter;

the instructions to receive the one of the multiple different physical uplink channels include instructions to receive the one of the multiple different physical uplink channels after transmitting the second transmit power control parameter;

the instructions to transmit the second transmit power control parameter include instructions to transmit the second transmit power control parameter in network signaling;

the network signaling is or includes one or more of physical layer signaling and RRC signaling;

the programming further includes instructions to receive, by the network device from the UE, a further one of the multiple different physical uplink channels transmitted by the UE at a further transmit power that is based on the first transmit power control parameter.

Other apparatus or system features may be implemented in some embodiments.

A baseline or reference model and offset or adjustment-based approach to transmit power control may provide a more unified and simplified power control methodology relative to more complicated conventional power control configurations. A stand-alone reference power control model is applicable to multiple uplink channels, and adapted to each individual uplink channel using one or more per-channel or channel-specific factors or parameters and a correlation relationship between such factors or parameters and baseline or reference transmit power according to the reference model. In some embodiments, a reference power control model is based on one typical uplink channel, PUSCH for example, and offsets for other uplink channels adjust from the reference model using pre-defined factor or parameter correlation relationships.

In some embodiments, transmit power control as disclosed herein can be more readily optimized, and may also provide forward compatibility, for example through modelling and AI-based training. Each uplink channel in 5G, for example, may list all of $\{P_{r\_0}\}$, $\{\alpha\}$, but these parameters can be quite random to use without any limits or implementation issues, and no performance is guaranteed. Power control reference modeling as disclosed herein can be well-suited to intelligent analysis and optimization, through AI training for example. Given AI-calibrated or otherwise calibrated reference parameters on optimized pairs of $\{P_{r\_0}\}$ and $\{\alpha\}$ for example, transmit power control consistent with embodiments disclosed herein can provide more consistent power control performance across uplink channels.

Future networks, such as 6G and beyond, may consider more factors for power control, such as additional sensing info, different use cases or application or service types such as URLLC+ and eMBB+, different access nodes, and quite different bandwidths and spectrums such as FR1 and mmWave. Other factors are also possible. Transmit power control as disclosed herein may provide modeling that is suitable for analysis, optimization, or training via AI, by taking into account one or more such factors.

Transmit power control may be applied in combination or conjunction with other features in some embodiments. In respect of application or service types, for example, in URLLC/URLLC+, mMTC, or eMBB use cases, transmit power control may be combined with link adaptation (LA) (in which the MCS selection by LA may consider how much power room is left over for increasing as needed, associated with power headroom reporting as described below), or work jointly with LA. Another possible use case involves downlink RS and uplink data transmission using different spectrums or frequency bands, in which case a correction offset can be pre-defined or evaluated to estimate uplink PL, for transmit power control, from downlink measurements.

Joint power control for multiple UEs may be supported in some embodiments. For example, inter-cell joint power control with joint scheduling in neighboring cells may be used to optimize $P_0$ while minimizing inter-cell interference or joint power control may also or instead be used to minimize communication device transmission power for power saving.

For a single communication device that supports communications with different carrier bands and/or different channels, simultaneous uplink transmission may be limited by a maximum transmit power, in which case different channels may share the uplink transmit power. A reference power control model that includes a power split ratio or power scaling factor may be used for this type of use case.

Power headroom reporting is another example of a feature that may be implemented with transmit power control in some embodiments. Power headroom is a difference between maximum transmission power and transmission power being used by a current transmission, and thus indicates how much transmission power is left over or remaining for a communication device to use in addition to transmission power that is currently being used. Power headroom reporting may be useful in closed loop power control to adjust, by increasing for example, communication device power. A network device that is involved in closed loop power control can determine, from power headroom reporting, how much power room remains available for power adjustment. Such reporting may also be useful for closed loop power control in simultaneous uplink transmission scenarios such as carrier aggregation (CA) or dual connectivity (DC) scenarios.

A power headroom report may be, or may be included in, a control element in signaling. For example, a power headroom report (PHR) is a type of MAC control element (MAC-CE) that reports the headroom between the current UE transmission power (estimated power) and nominal power. PHR is encoded in 6 bits with a reporting range from −23 dB to +40 dB in steps of 1 dB.

A network device such as an eNodeB may use a reported power headroom value to estimate how much uplink bandwidth a communication device can use for a specific subframe, for example. The more RBs that a communication is currently using, the higher transmit power gets, and in some deployments transmit power should not exceed a defined maximum power. A communication device therefore might not be able to use additional RBs or bandwidth, and as a result certain applications, services, or features may be unavailable, if the device does not have enough power headroom.

Power headroom reporting may be trigged by any of various conditions or events, such as any one or more of the following:

periodically, by a timer for example;

responsive to an instruction or command received from a network device such as a BS;

adding or reducing the number of simultaneous links being used;

a path loss change greater than a threshold—path loss can be determined by a communication device based on RS power notified by a network device and measured RS power at the communication device, such as at a UE antenna port, and if this path loss value changes more than a threshold then the communication device transmit a power headroom report;

mobility—a mobility-based power headroom report may be triggered if a communication device moves faster than a certain speed, for example;

a network node switch, when a communication device is to switch or hand over to a different network node, from TN to NTN, from NTN to TN, from one TRP to another TRP, etc.;

a power trigger, such as when transmit power usage reaches or exceeds a threshold, such as a percentage (e.g., 95%) of maximum power.

A power headroom report may be channel-specific (e.g., PUSCH-only based, PUCCH-only based, or SRS-only based), transmission period-based, a virtual power headroom report for a non-scheduled serving cell for CA or DC scenarios, or a combination of one or more of these examples.

CA and/or DC may be supported in some embodiments. A communication device may connect to different network nodes such as one TN and one NTN, for example. With multiple links, maximum power constraints, and/or other power control constraints, may be applied for simultaneous transmissions.

Any of various priority conditions or rankings may be applied between channels, and the following are illustrative examples:

PRACH in primary cell (Pcell)>PUCCH/PUSCH with ACK/NACK; and/or Scheduling Request>PUCCH/PUSCH with other uplink control information (UCI) >PUSCH without UCI>SRS/PRACH of secondary cell (Scell);

connections with TN nodes and NTN nodes may have different priorities, which may be network-configured.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method comprising:
receiving, by a user equipment (UE) in a wireless communication network, a first transmit power control parameter that is common to transmit power control for multiple different physical uplink channels;
transmitting, by the UE, one of the multiple different physical uplink channels at a transmit power that is based on the first transmit power control parameter and a second transmit power control parameter that is specific to the transmit power control for the one of the multiple different physical uplink channels.

2. The method of claim 1, wherein the first transmit power control parameter comprises a large time-scale parameter.

3. The method of claim 1, wherein the second transmit power control parameter comprises a channel-specific parameter.

4. The method of claim 3, wherein the channel-specific parameter comprises one or more parameters of a set of dynamic communication parameters and a set of other factors that are used to estimate a channel-specific offset.

5. The method of claim 4, wherein the set of dynamic communication parameters comprises one or more of:
numerology;
transmission bandwidth;
modulation and coding scheme (MCS);
channel format;
multiple-link configuration;
multiple-input multiple-output (MIMO) with active beam direction.

6. The method of claim 4, wherein the set of other factors comprises one or more of:
channel differentiation;
carrier frequency;
network node type;
application type;
multiple-input multiple-output (MIMO) with active beam direction.

7. The method of claim 1, wherein the transmit power control for the multiple different physical uplink channels is associated with a reference model that is based on the first transmit power control parameter and the second transmit power control parameter.

8. The method of claim 1, wherein receiving the first transmit power control parameter comprises receiving the first power control parameter in one or more of radio resource control (RRC) signaling and physical layer signaling.

9. A user equipment (UE) for a wireless communication network, the UE comprising:
a communication interface;
a processor, coupled to the communication interface;
a non-transitory computer readable storage medium, coupled to the processor, storing programming for execution by the processor, the programming comprising instructions to:

receive a first transmit power control parameter that is common to transmit power control for multiple different physical uplink channels;

transmit one of the multiple different physical uplink channels at a transmit power that is based on the first transmit power control parameter and a second transmit power control parameter that is specific to the transmit power control for the one of the multiple different physical uplink channels.

10. The UE of claim 9, wherein the first transmit power control parameter comprises a large time-scale parameter.

11. The UE of claim 9, wherein the second transmit power control parameter comprises a channel-specific parameter.

12. The UE of claim 11, wherein the channel-specific parameter comprises one or more parameters of a set of dynamic communication parameters and a set of other factors that are used to estimate a channel-specific offset.

13. The UE of claim 12, wherein the set of dynamic communication parameters comprises one or more of:

numerology;
   transmission bandwidth;
   modulation and coding scheme (MCS);
   channel format;
   multiple-link configuration;
   multiple-input multiple-output (MIMO) with active beam direction.

14. The UE of claim 12, wherein the set of other factors comprises one or more of:

channel differentiation;
   carrier frequency;
   network node type;
   application type;
   multiple-input multiple-output (MIMO) with active beam direction.

15. The UE of claim 9, wherein the transmit power control for the multiple different physical uplink channels is associated with a reference model that is based on the first transmit power control parameter and the second transmit power control parameter.

16. The UE of claim 9, wherein the instructions to receive the first power control parameter comprise instructions to receive the first power control parameter in one or more of radio resource control (RRC) signaling and physical layer signaling.

17. A method comprising:

transmitting, by a network device to a user equipment (UE) in a wireless communication network, a first transmit power control parameter that is common to transmit power control at the UE for multiple different physical uplink channels;

receiving, by the network device from the UE, one of the multiple different physical uplink channels transmitted by the UE at a transmit power that is based on the first transmit power control parameter and a second transmit power control parameter that is specific to the transmit power control for the one of the multiple different physical uplink channels.

18. The method of claim 17, wherein the first transmit power control parameter comprises a large time-scale parameter.

19. The method of claim 17, wherein the second transmit power control parameter comprises a channel-specific parameter.

20. A network device for a wireless communication network, the network device comprising:

a communication interface;
   a processor, coupled to the communication interface;
   a non-transitory computer readable storage medium, coupled to the processor, storing programming for execution by the processor, the programming comprising instructions to:

transmit, to a User Equipment (UE) in the wireless communication network, a first transmit power control parameter that is common to transmit power control at the UE for multiple different physical uplink channels;

receive, from the UE, one of the multiple different physical uplink channels transmitted by the UE at a transmit power that is based on the first transmit power control parameter and a second transmit power control parameter that is specific to the transmit power control for the one of the multiple different physical uplink channels.

21. The network device of claim 20, wherein the first transmit power control parameter comprises a large time-scale parameter.

22. The network device of claim 20, wherein the second transmit power control parameter comprises a channel-specific parameter.

* * * * *